No. 804,891. PATENTED NOV. 21, 1905.
A. J. SLADE.
VEHICLE TIRE.
APPLICATION FILED JULY 19, 1905.
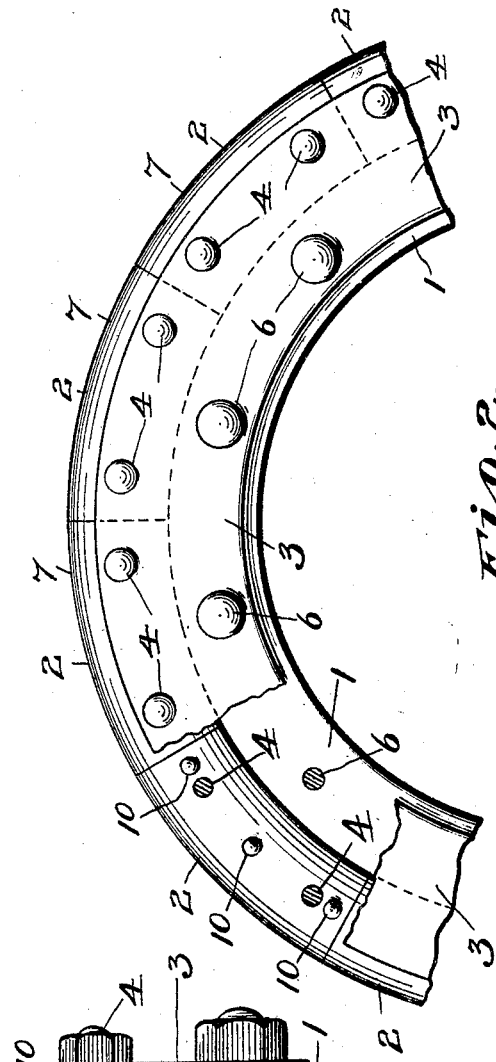
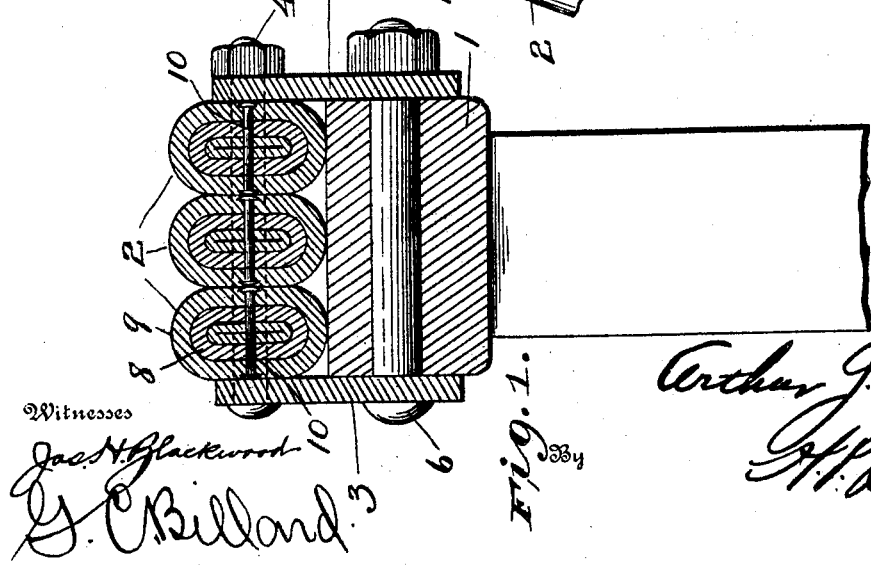
Witnesses
Inventor
Arthur J. Slade
Attorney

UNITED STATES PATENT OFFICE.

ARTHUR J. SLADE, OF NEW YORK, N. Y.

VEHICLE-TIRE.

No. 804,891.	Specification of Letters Patent.	Patented Nov. 21, 1905.

Application filed July 19, 1905. Serial No. 270,383.

*To all whom it may concern:*

Be it known that I, ARTHUR J. SLADE, a citizen of the United States, residing at New York, in the county of New York and State of New York, have invented new and useful Improvements in Vehicle-Tires, of which the following is a specification.

My invention relates to vehicle-tires, and its object is to provide an elastic tire particularly adapted for trucks and other heavy commercial vehicles.

To this end my invention is embodied in preferable form in the device hereinafter described, and illustrated in the accompanying drawings.

In the drawings, in which like letters of reference denote the same parts throughout both views, Figure 1 is a cross-section, and Fig. 2 a side view broken away, of my improved tire.

Referring to the drawings, 1 is a wooden felly of the usual construction. The tire is supported on this felly. It comprises a plurality of circumferential elliptical tread members 2, which are clamped between iron plates 3, forming a channel-rim. Bolts 4 secure the plates to the tread members 2, and the plates in turn are fastened to the felly by bolts 6. Each tread member is made in sections 7, and the sections are then bolted to the wheel-rim. The tread member of each section consists of concentric layers of rubber 8 and of fabric 9, vulcanized or otherwise suitably secured together, and the sections are made in circular form, preferably of tubular formation, and then compressed into elliptical shape. While being compressed into elliptical shape in a suitable former, the sections are at the same time given the curve corresponding to the curvature of the wheel to which they are to be applied. The sections when compressed are secured in such form by means of rivets 10, passing through the layers, or by other suitable means. If desired, any number of the circular sections placed side by side could be compressed into elliptical shape at the same time and all riveted together with one set of rivets instead of compressing and riveting each section separately. The sections may be made in different lengths, depending upon the diameter of the wheel to which they are to be applied. To suit the width of the wheel-rims, as many sections may be bolted together side by side as may be necessary, thus forming sectional tire-blocks. These blocks are then bolted to the wheel in the usual manner. A tire formed of these blocks composed of alternating layers of rubber and fabric gives a very tough and durable structure, while at the same time one that can be readily repaired and renewed by removing any of the blocks. The separated elliptical tread-surfaces lessen friction and at the same time prevent almost entirely sliding or skidding of the wheel. The compressed condition of the tire enables a strong and rigid fastening means like the bolts to be employed without danger of tearing the tire apart, and accordingly the tire is well adapted for use with heavy automobile-trucks and other heavy commercial vehicles.

It is clear that changes in the details of construction of the tire may be made without departing from my invention.

Having thus described my invention, what I claim is—

1. A vehicle-tire having an elastic body composed of concentric alternate layers of rubber and fabric compressed from circular form into elliptical shape and secured on the wheel in such compressed condition, substantially as described.

2. A vehicle-tire having an elastic body composed of concentric alternate integrally-united layers of rubber and fabric compressed from circular form into elliptical shape and secured on the wheel in such compressed condition, substantially as described.

3. A vehicle-tire having a plurality of elastic bodies, each consisting of concentric alternate integrally-united layers of rubber and fabric compressed from circular form in cross-section into elliptical shape and providing separate tread-surfaces, a channel-rim, and bolts for securing said bodies together side by side in said compressed condition on said rim, substantially as described.

4. A vehicle-tire composed of circumferential blocks of an elastic body formed of alternating concentric layers of rubber and fabric compressed from circular form into elliptical shape, a rim and means to secure such
5 blocks to said rim, substantially as described.

5. A vehicle-tire composed of circumferential elastic blocks formed of alternating concentric layers of rubber and fabric and having a plurality of said series of blocks arranged side by side and means to clamp said 10 blocks together, substantially as described.

In testimony whereof I affix my signature in presence of two subscribing witnesses.

ARTHUR J. SLADE.

Witnesses:
DAVID McMEEKAR,
GUY M. JONES.